United States Patent [19]

Bartlett

[11] 4,440,204
[45] Apr. 3, 1984

[54] PLANER MOUNTING SYSTEM

[75] Inventor: Robert L. Bartlett, Dayton, Ohio

[73] Assignee: Shopsmith, Inc., Vandalia, Ohio

[21] Appl. No.: 408,531

[22] Filed: Aug. 16, 1982

[51] Int. Cl.³ .............................................. B27C 1/02
[52] U.S. Cl. ................................ 144/130; 144/246 F;
144/120; 29/27 A; 29/560; 408/26; 83/100
[58] Field of Search .................. 144/1 R, 1 C, 114 R,
144/117 R, 245 R, 246 R, 247, 252 R, 252 A;
29/27 A, 560; 408/26; 83/100

[56] References Cited

U.S. PATENT DOCUMENTS 2,873,776  2/1959  Buttke .................................. 144/114

FOREIGN PATENT DOCUMENTS 641576  4/1928  France ................................. 144/120

Primary Examiner—W. Donald Bray
Assistant Examiner—Jorji Griffin
Attorney, Agent, or Firm—Biebel, French & Nauman

[57] ABSTRACT

A planar of the type adapted to be mounted on and driven by a multipurpose woodworking tool includes a housing, a rotating blade member, and a table mounted beneath the blade member and vertically displaceable relative thereto by a plurality of jack screws. The jack screws carry connector nuts having outer members attached to the table which allow relative sideward movement between the table and screws to minimize table binding. A chain drive engages the jack screws and includes an idler sprocket which can be adjusted to allow adjustment of an individual jack screw to level the table. First and second roller assemblies upstream and downstream of the blade member are rotatably mounted on the housing and are vertically displaceable; the roller assemblies are driven by a single, fixed drive sprocket which is capable of rotating the rollers throughout a range of vertical displacement. A chip removal hood is mounted on the housing and has an exhaust nozzle adapted to receive a hose of a vacuum cleaner to draw chips through the hood. A pair of clamping members are attached to side walls so that the blade member and an output shaft of a head stock of the woodworking tool are coaxial, whereby a coupling member may be used to transmit rotary power therebetween. A switching device includes a master switch that controls the flow of electric current to both the head stock and the electric motor driving the feed mechanism, and includes a key-operated locking mechanism.

4 Claims, 21 Drawing Figures

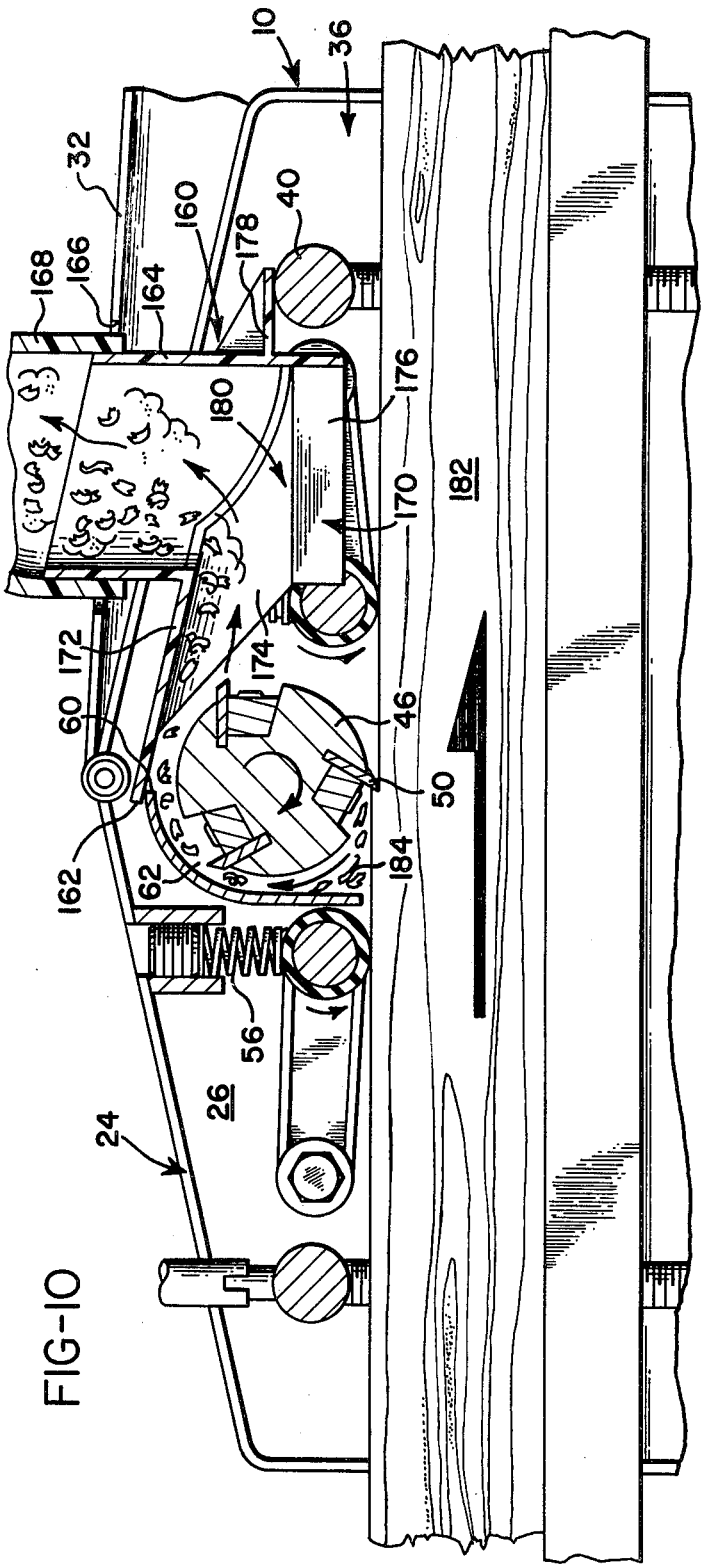

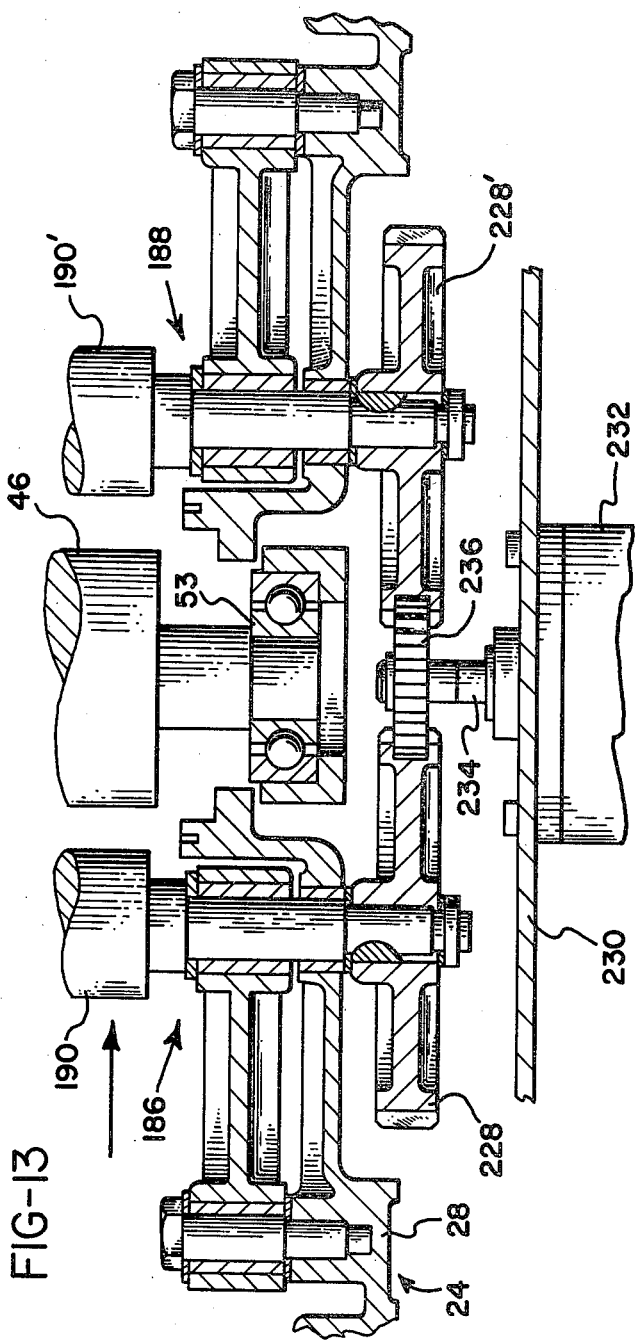

PLANER MOUNTING SYSTEM

BACKGROUND OF THE INVENTION

1. Field of the Invention

The present invention relates to motor-driven planers and, more particularly, motor-driven planers adapted to be mounted to multipurpose woodworking tools.

2. Prior Art

Motor-driven planers typically are used for planing wood stock which is relatively wide, on the order of 3 to 12 inches. Such planers include a housing having an interior chamber and a blade member rotatably mounted to the housing and extending transversely of the interior chamber. The blade member is generally cylindrical in shape and includes a plurality of elongated cutting blades which are removably mounted to an axle. The blade member includes an end protruding through the housing adapted to be coupled to an electric motor which is either mounted to the housing and drives the blade member directly, or is mounted remotely from the housing and drives the blade member through a coupling member.

Motorized planers also typically include a table which supports the wood stock as it is fed into the interior chamber to engage the rotating blade member. The table is substantially flat and is positioned within the interior chamber beneath the blade member. The table is joined to the housing by elevating means which typically includes a plurality of jack screws rotatably mounted to the housing and joined to the table by connector nuts. Rotation of the jack screws displaces the nuts, causing the table to be elevated or lowered relative to the blade member. The table is vertically adjusted to vary the cutting or planing depth of the blade member, and to accommodate stock of varying thicknesses.

A disadvantage of motorized planers which utilize jack screws for elevating the tables is that the jack screws must be oriented vertically within the interior chamber and parallel to each other with high precision. Should the jack screws be slightly skewed relative to each other, the table will bind as it is displaced upwardly or downwardly. Since the relative distance between one jack screw and another would vary along its length in such a situation, a lateral force would be exerted between the connector nuts, mounted to the table and thereby fixed relative to each other, and the jack screws as the table is vertically displaced. The requirement for high precision in the alignment of jack screws relative to one another greatly increases the cost of fabrication of motorized planers and often results in a total cost which renders such planers undesirable for use by the non-commercial woodworker or hobbyist.

Another disadvantage with such table elevating mechanisms is that is is difficult to vary the distance between the surface of the table and the cutting blades of the blade member with high precision. Typically, a depth gauge is provided which consists of a vertical scale attached to a side of the housing adjacent the table and an indicator arrow attached to the table. Displacement of the table causes the arrow to move relative to the scale. While such a scale is acceptable for large displacements on the order of ½ inch and greater, such a scale is not acceptable for displacements less than approximately ⅜ inches.

An additional disadvantage of such table elevating mechanisms for motorized planers is that occasionally the table becomes inclined or skewed relative to the position of the blade member, which can result in wood stock being planed such that the resultant thickness of the planed stock varies across its width. Adjustment of jack screws often requires the disengagement of one or more jack screws from a drive mechanism and the rotation of the individual jack screw to level the table properly. In many table elevating mechanisms for planers or other types of woodworking tools, the jack screws each include sprockets which are joined by a common sprocket chain such that rotation of one jack screw by an external source of power results in synchronous rotation of the other jack screws. With such devices, adjustment of a single jack screw requires the removal of the drive chain from the sprockets which may necessitate the separation of the sprocket chain by removing a master link, a difficult and time-consuming operation.

Motorized planers also typically include feed mechanisms which comprise rollers positioned upstream and downstream of the blade member, rotatably attached to the housing and extending transversely of the interior chamber. The rollers engage and propel stock along the table beneath the blade member. The rollers typically are driven by external means such as a hand crank or an electric motor. A disadvantage of many types of feed mechanisms is that the rollers require complex apparatus for raising or lowering their position relative to the blade member, or for exerting a downward force on the stock. Such apparatus is often complicated in structure and greatly increases the overall expense of the planer.

While virtually all types of motorized woodworking devices create a problem of sawdust or wood chip removal, the problem is particularly severe for motorized planers, especially if a relatively deep planing operation is performed on a relatively wide piece of stock. Since the blade member is rotated in a direction which is counter to the direction of feed of the stock, the wood chips tend to be driven back toward the user, covering the clothes of the user and presenting a possible hazard of contacting the user's face and eyes. To remedy the situation, motorized planers include a chip shield which consists of an elongated piece of metal or plastic having an arcuate contour and mounted to the housing to extend transversely of the interior chamber adjacent and upstream of the blade member such that the shield curves about an upstream portion of the periphery of the blade member.

The chip shield forms a passageway with the adjacent portion of the outer periphery of the blade member such that, when the planing operation is performed, chips are pumped by the rotating action of the blades along the passageway and are propelled forwardly within the interior chamber downstream of the blade member. While a chip shield changes the direction of chip travel during the planing operation so that the chips are not propelled rearwardly toward the operator, the chips are still propelled out of the planer and clutter the work area surrounding the motorized planer.

Many motorized planers are designed to utilize the head stock or main electric motor of larger, multipurpose woodworking systems. Typically, the planer includes means for mounting the planer housing to the larger woodworking system adjacent the head stock, and the blade member includes an end adapted to be joined to the output shaft of the head stock by a coupling member.

While such planers are desirable in that they may utilize the head stock of existing woodworking machinery, there are some disadvantages. For example, such motorized planers often require an auxiliary source to power the feed mechanism and therefore require the operator to actuate two switches to start or stop the device; a main power switch for actuating the head stock motor which drives the blade member, and a secondary switch which actuates the feed mechanism. A second disadvantage is that planers utilizing the head stocks of larger woodworking tools often require coupling members which provide an offset drive so that the output shaft of the head stock can be coupled to the blade member. Such offset drive coupling members are often expensive and result in power transmission losses.

Accordingly, there is a need for a motorized planer which can be mounted directly to a larger, multipurpose woodworking tool, which is simple in construction, which utilizes the head stock of the multipurpose tool, and utilizes a simple and relatively inexpensive coupling member, and which includes a single master switch for actuating both the head stock motor and an auxiliary drive motor. Furthermore, there is a need for a motorized planer having a table elevated by jack screws which does not require precision mounting of the jack screws to the planer housing to prevent binding and which provides a relatively high precision depth gauge adjustment. Furthermore, there is a need for a motorized planer having a chip removal system which eliminates the clutter and contamination of the work area by wood chips generated during the planing operation.

SUMMARY OF THE INVENTION

The present invention is a motor-driven planer which overcomes the aforementioned prior art difficulties. The planer is adapted to be powered by the head stock of a larger, multipurpose woodworking tool. The planer of the present invention is of the type having a housing which includes an interior chamber and a motor-driven blade member rotatably mounted to the housing and extending transversely of the interior chamber.

The planer includes an improved table assembly which comprises a plurality of jack screws rotatably mounted to the housing and positioned substantially vertically within the interior chamber, a table positioned adjacent the jack screws beneath the blade member and having a substantially flat, horizontal surface, and a plurality of connector nuts, each including an outer member mounted to the table for rotational and sideward movement with respect thereto, and an inner member threadedly receiving an associated one of the jack screws and retained by the outer member to permit rotational and relatively slight sideward movement in a substantially vertical plane extending transversely of the table surface. A chain and sprocket drive synchronously rotates the jack screws to selectively elevate or lower the table. The utilization of connector nuts having inner and outer members which are rotatable and sidewardly displaceable relative to the table permits the table to be elevated or lowered within the interior chamber without binding, even if the jack screws are relatively skewed to each other, since the variation in distance between jack screws along their lengths is compensated for by the flexibility inherent in the connector nuts.

The sprocket drive for the table assembly includes a plurality of sprockets mounted to the jack screws, a sprocket chain entrained about the sprockets, and an idler sprocket mounted to the housing and selectively displaceable in a horizontal plane relative to the housing and the other sprockets. By displacing the idler sprocket, the sprocket chain can be tightened or loosened such that the sprocket chain can be disengaged from a selected one of the sprockets. Once the sprocket chain has been disengaged from a selected sprocket, its associated jack screw may be rotated relative to the other jack screws, thereby leveling the table relative to the blade member and housing.

Additionally, the horizontally displaceable idler sprocket provides a simple and inexpensive chain tensioning mechanism which allows the chain to be tensioned for proper useage. In a preferred embodiment, a selected one of the jack screws comprises a driving jack screw which is rotated by a hand wheel attached to an upper end of the jack screw and positioned above a top surface of the planer housing.

The hand wheel includes a depth gauge which consists of a disk-shaped plate having indicia spaced in predetermined, measured increments about its periphery, and the housing includes a reference indicia which is positioned directly beneath the gauge. Rotation of the hand wheel so that a predetermined number of gauge indicia pass said reference incidia results in the table being raised or lowered a known distance. Since relatively large rotation of the jack screws result in a relatively slight elevation or lowering of the table, such a depth gauge is much more accurate than prior art depth gauges comprising a vertical scale mounted to the housing and an indicator arrow mounted to the table.

The planer of the present invention also includes an improved feed mechanism having first and second roller assemblies positioned upstream and downstream of the blade member, respectively, each including rollers extending between and mounted to the side walls for rotation and substantially vertical displacement, and an extension protruding through one of the side walls which mounts a roller sprocket exteriorly of the housing, a spring biasing the rollers downwardly, and a stop limiting the downward movement of the rollers. The feed mechanism also includes a mechanism for rotating the roller sprockets, preferably consisting of an electric motor mounted to a side of the housing and including a drive sprocket which engages the roller sprockets. The drive sprocket meshes with the roller sprockets sufficiently to provide a driving rotational motion regardless of the vertical positioning of the rollers relative to the housing and the drive sprocket. The roller assemblies both provide a feed mechanism for conveying the wood stock past the blade member at a predetermined rate set by the drive mechanism and exert a resilient downward force which urges the stock against the table. The roller assemblies are individually adjustable relative to each other so that the roller downstream of the blade member may rotate downwardly to compensate for the reduced height of the planed stock. The roller assemblies provide this dual function and yet are relatively simple in construction and are not closely toleranced, thereby reducing the overall cost of the planer in relation to comparably equipped prior art devices.

In order to reduce substantially the clutter and contamination caused by the ejection of wood chips from the planer housing during a planing operation, the present invention provides an improved chip removal system which consists of a chip removal hood mounted to the housing and including a leading transverse edge positioned immediately adjacent and coextensive with the trailing edge of the chip shield, an exhaust nozzle adapted to receive the hose of a standard shop vacuum or other vacuuming device, and panels which converge toward the nozzle and form a concavity which opens toward the downstream side of the blade member. The chip removal hood preferably is formed to fit integrally with the interior chamber of the housing and includes lateral surfaces which abut the opposing side walls of the housing so that the side walls form a portion of the concavity.

In operation, the chip removal hood is attached to a vacuum cleaner hose and the vacuum actuated prior to the planing operation. During the ensuing planing operation, chips generated are propelled forwardly through the passageway between the blade member and the chip shield and downstream of the blade member to the concavity formed by the converging panels. The chips are then drawn from the concavity through the exhaust nozzle and into the vacuum cleaner hose.

The planer of the present invention is particularly adapted for use with a large, multipurpose woodworking tool of the type having a frame which includes a pair of horizontal, parallel ways which support a head stock. The head stock is slidably mounted to the ways and includes an output shaft having a substantially horizontal axis of rotation oriented parallel to the ways. The planer includes a mounting system which releasably mounts the planer to the ways such that the blade member is coaxial with the axis of rotation of the output shaft of the head stock. Accordingly, a relatively simple and inexpensive coupling member is employed which is coaxial with the output shaft and the blade member such that it transmits rotary power from the output shaft lineraly to the blade member along the axis of rotation.

The mounting system includes a pair of clamping members, each attached to one of the side walls of the housing and including a bolt threaded into and extending downwardly from an associated side wall, a retaining bar slidably attached to the bolt and having opposing ends with upwardly facing notches sized and positioned to receive the ways, and a winged cap nut mounted to a lower end of the bolt to support the retaining bar and facilitate the threading of the bolt upwardly in the side walls of the housing. Displacement of the cap nuts and bolts upwardly into the side walls of the housing urges the bars upwardly, which clamps the ways between the notches of the retaining bars and the underside of the housing side walls.

The housing side walls preferably include cutouts sized and positioned to receive the ways such that, when the planer is mounted to the tool, the ways are clamped between the cutouts of the housing and the notches in the retaining bars. The side walls of the planer housing are sized such that, when the housing is so mounted to the ways, the blade member is positioned coaxially with the axis of rotation of the head stock output shaft. Thus, expensive offset power transmitting couplings are not required to join the output shaft to the blade member.

Another advantage of the present invention which makes it particularly suitable for use with a larger, multipurpose woodworking tool is that it includes a switching device which is adapted to actuate both the head stock of the woodworking tool and the drive motor for the stock feeding mechanism with a single master switch. The switching device includes a master switch connected to a source of alternating current, a first receptacle connected in parallel and controlled by the master switch for receiving the power cord from the head stock, a rectifier connected to the source for converting alternating current from the source to direct current, a second receptacle connected to the rectifier for supplying direct current to the stock feed motor, and a potentiometer for selectively varying the direct current voltage across the second receptacle.

The switching device is mounted within a switch box and the master switch includes a switch member, slidably mounted within the box and having a button portion protruding through the top of the box and a lever portion extending through a recess in a side. A downward force applied to either the button portion or the lever portion opens the switch and shuts off both the head stock and feed motor, and an upward force applied to the lever portion displaces the switch member upwardly to close the switch and activate both the head stock and feed motors. Thus, a single switch member at a single location controls both the head stock and feed motors.

The switching device also includes a mechanism for locking the switch in a downward of "off" position. A locking pin is mounted to the control box and includes a detent which is positioned so that a sideward displacement of the pin to a locked position brings the detent into a locking engagement with the switch member, thereby preventing its upward displacement, and displacement of the pin to an unlocked position disengaged the detent from the switch member. The pin is biased by a spring to the locked position so that the switch member locks automatically when switched to the off position.

To maintain the switch members and pin in an unlocked position, the locking mechanism includes a key which is inserted into the control box for selectively displacing and holding the pin in an unlocked position so that the switch member may be displaced upwardly and downwardly without locking. When the key is displaced away from the pin, the biasing spring displaces the pin into the locked position which prevents the switch from being displaced upwardly to actuate the stock and feed motors.

Accordingly, it is an object of the present invention to provide a motorized planer which is of relatively simple construction and does not require closely toleranced parts that add to the cost of fabrication; which includes a table elevating assembly which utilizes jack screws and compensates for misalignment of the jack screws relative to each other to prevent binding of the table and which allows individual adjustment of jack screws to level the table; in which the table assembly includes a relatively high precision depth gauge; which includes a feed mechanism having vertically displaceable rollers positively driven by a drive sprocket throughout the range of vertical travel of the rollers; which includes a chip removal system utilizing a conventional shop vacuum that removes wood chips from the vicinity of the housing; having a mounting system which permits the planer table to be mounted to a larger, multipurpose woodworking tool such that the blade member is coaxial with the output shaft of the head stock; and includes a switch mechanism which provides a single master switch for actuating both the head stock and feed motors and has a locking mechanism for preventing the inadvertent actuation of the motors.

Other objects and advantages of the invention will be apparent from the following description, the accompanying drawings and the appended claims.

BRIEF DESCRIPTION OF THE DRAWINGS

FIG. 10 is a detail of a side elevation in section of the planer taken at line 10—10 of FIG. 1 and showing the chip removal hood attached to a vacuum hose;

FIG. 13 is a detail of a view in section looking downwardly of the roller assemblies shown in FIGS. 3 and 4, and showing the link arms, roller sprockets and drive sprocket;

DESCRIPTION OF THE PREFERRED EMBODIMENTS

Figure 1:
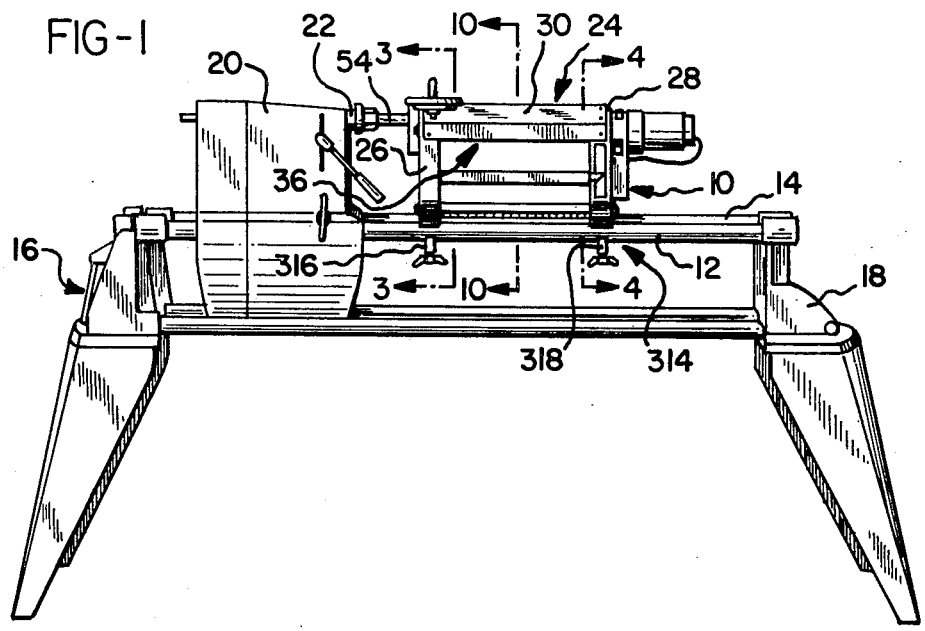
FIG. 1 is a side elevation of a preferred embodiment of the motor-driven planer of the present invention, shown mounted to a multipurpose woodworking tool.

As shown in FIG. 1, the planer of the present invention, generally designated 10, is adapted to be mounted to the ways 12, 14 of a multipurpose woodworking tool 16 of well-known construction, such as that disclosed in the Edgemond, Jr., et al. U.S. Pat. No. 2,927,612, commonly assigned and incorporated herein by reference. The tool 16 includes a frame 18 which supports the ways 12, 14 and a head stock 20, slidably mounted to the ways. The head stock 20 includes an electric main drive motor (not shown) having an output shaft 22 with an axis of rotation oriented substantially horizontally and parallel to the ways 12, 14.

As shown in FIGS. 1, 2, 3, and 4, the planer 10 includes a housing 24 having a pair of side walls 26, 28, a fixed top cover 30 and a top hood 32 mounted to the side walls by a hinge 34 and secured thereto by latches 35. The side walls 26, 28, fixed cover 30, and top hood 32 define an interior chamber 36 within the housing 24.

The side walls 26, 28 are spaced apart by connecting rods 38, 40, 42, 44. Rods 38–44 are attached to the side walls 28 and extend transversely of the interior chamber 36.

The planer 10 includes a blade member, generally designated 46, having a substantially cylindrical body 48 mounting a plurality of cutting blades 50 which are coextensive with the body and include cutting edges 52. The blade member 46 is rotatably mounted to the end walls 26, 28 of the housing 24 by bearings 53 (FIGS. 15 and 20) and extends transversely of the interior chamber 36. The blades 50 are oriented such that the blade member 46 is rotated counter to the direction of stock feed, represented by the broken arrow A in FIGS. 3 and 4. The blade member 46 is driven by the output shaft 22 of the head stock 20 through a coupling member 54, the structure of which will be described subsequently in greater detail.

Figure 3:
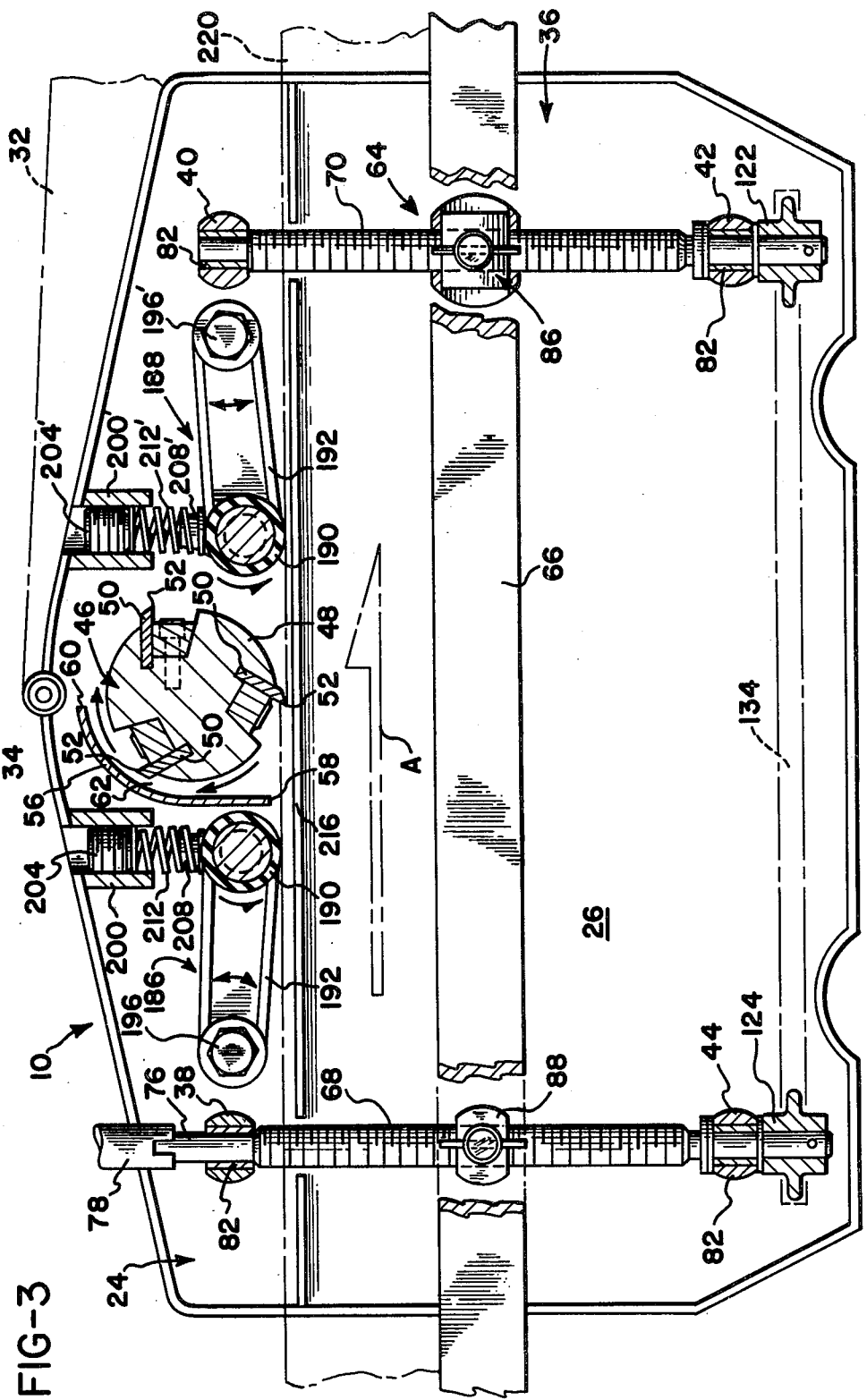
FIG. 3 is a side elevation in section of the planer taken at line 3—3 of FIG. 1.
Figure 4:
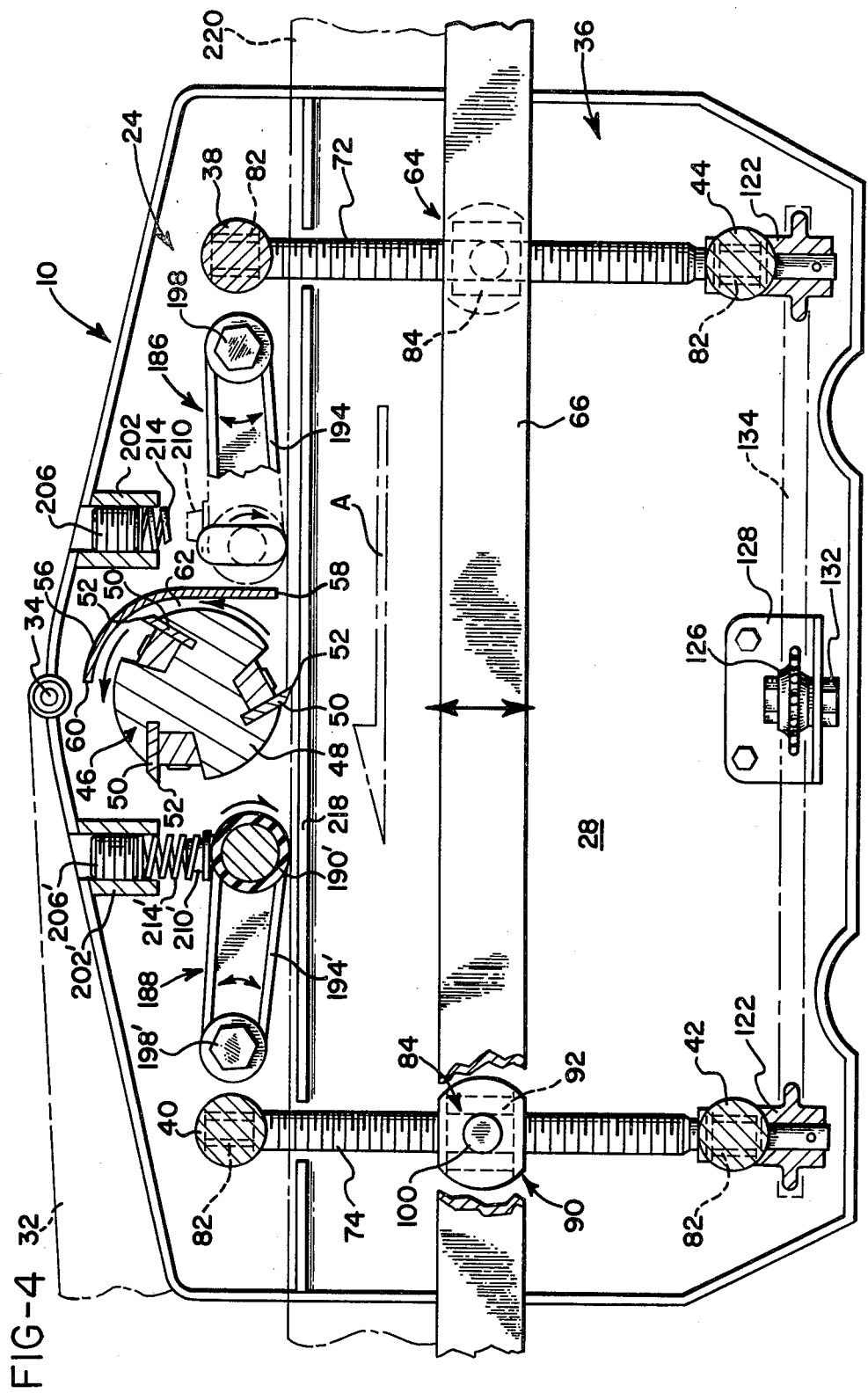
FIG. 4 is a side elevation of the planer taken at line 4—4 of FIG. 1.

As shown in FIGS. 3 and 4, the planer housing 24 includes a chip shield 56 which extends transversely of the interior chamber 36 and is attached to side walls 26,28. The chip shield 56 is generally arcuate in cross section, as shown in FIGS. 3 and 4, and is positioned adjacent the blade member 46 such that it curves about the outer periphery defined by the cutting edges 52 of the blades 50.

The chip shield 56 includes a leading edge 58 which is positioned upstream of the blade member 46 and above the lowermost travel of a cutting edges 52 at a distance greater than the deepest planing cut the planer 10 is capable of making, so that the leading edge 58 does not interfere with the travel of the stock toward the blade member 46. The trailing edge 60 of the chip shield 56 is positioned directly above the blade member 46. The chip shield 56 and the adjacent portion of the blade member 46 define a passageway 62 which extends between the leading and trailing edges 58, 60 of the chip shield 56.

During a planing operation, the rotation of the blade member 46 causes the blades 50 to plane chips from the stock and drive them upwardly through the passageway 62 and past the trailing edge 60, ejecting them in a forward direction downstream of the blade member. The aforementioned elements of the planer 10 are well-known and typically can be found in many high-quality commercial and domestic motorized planers.

Table Assembly

Figure 2:
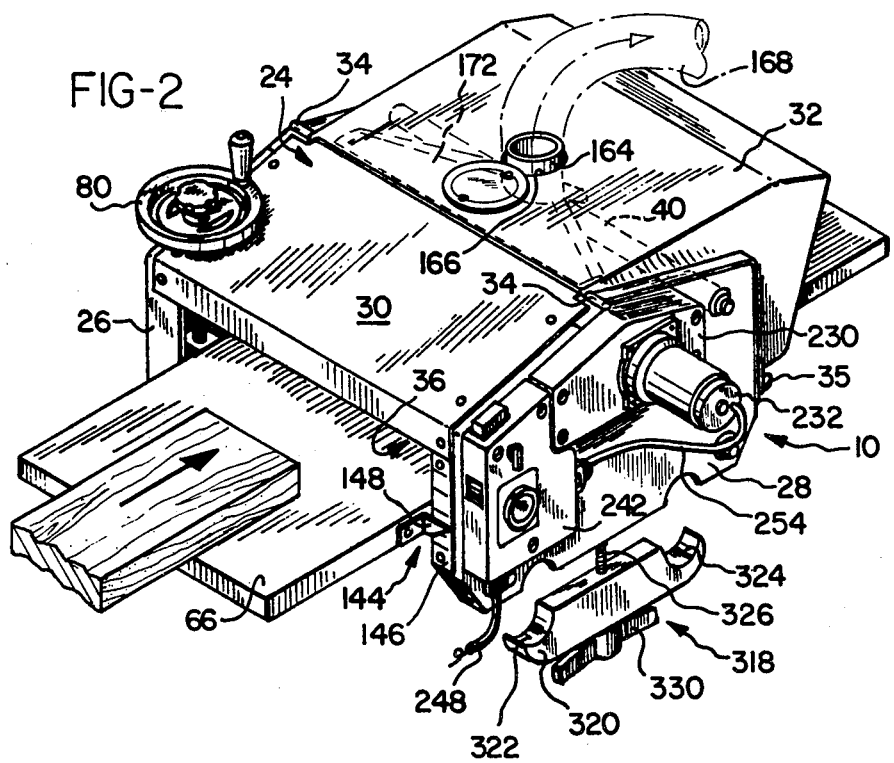
FIG. 2 is a perspective view of the planer of FIG. 1, showing wood stock being fed across the table and a vacuum hose in phantom attached to the exhaust nozzle of the chip removal hood.

As shown in FIGS. 1–4, the planer 10 includes an improved table assembly, generally designated 64, having a table 66 and jack screws 68, 70, 72, 74. The jack screws 68–74 are vertically mounted within the interior chamber 36 of the housing 24 and are oriented substantially parallel to each other. Jack screw 68 is a driving screw and is rotatably mounted in rod 38 at its upper end and rod 44 at its lower end. Driving screw 68 includes an extension 76 which engages a slotted boss 78 of a hand wheel 80 (FIG. 2).

Similarly, jack screw 70 is rotatably mounted to rod 40 at an upper end and rod 42 at a lower end, jack screw 72 to rod 38 at an upper end and rod 44 at a lower end, and jack screw 74 to rod 40 at an upper end and rod 42 at a lower end. All of the jack screws 68–74 are retained within their respective rods 38–44 by bushings 82.

Figure 7:
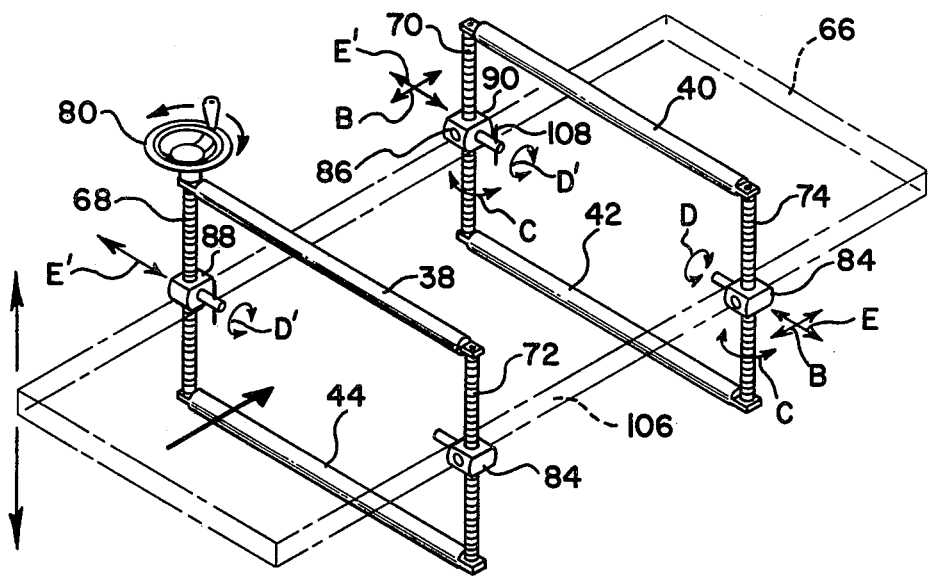
FIG. 7 is a perspective, somewhat schematic view of the table, jack screws and connecting rods of the planer of FIG. 1, showing the table in phantom.

As shown in FIGS. 3, 4, and 7, the table 66 is joined to jack screws 72, 74 by connector nuts 84. Similarly, jack screw 70 is joined to the table 66 by connector nut 86 and driving screw 68 is joined to the table by connector nut 88.

Figure 5:
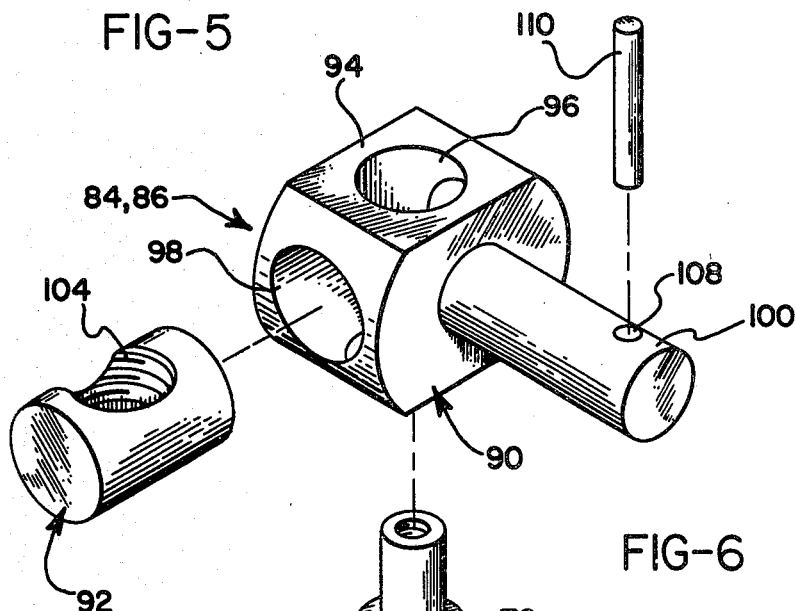
FIG. 5 is an exploded perspective view of a two-piece connector nut of the type shown in FIGS. 3 and 4 and a top portion of an associated jack screw.
Figure 6:
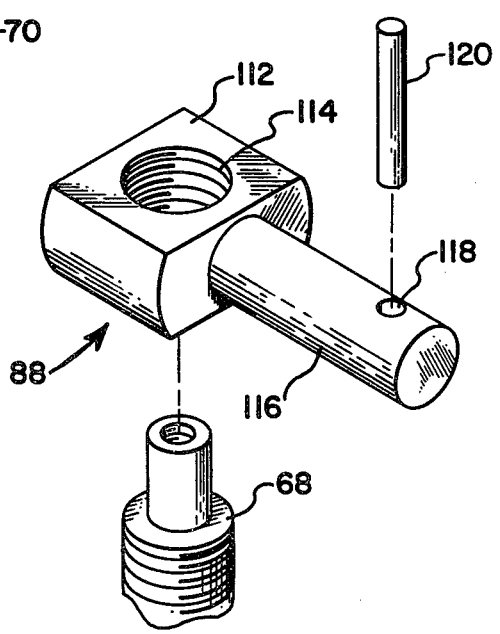
FIG. 6 is an exploded perspective view of the one-piece connector nut shown in FIG. 3 and an associated driving jack screw.

As shown in FIG. 5, connector nuts 84, 86 are two-piece connector nuts and include an outer member 90 and an inner member 92. Outer member 90 includes a cage portion 94 having a vertical bore 96 and a transverse bore 98. A shaft 100 extends outwardly from a side of the cage portion 94 and is journaled within a bore (not shown) formed in a longitudinal edge of the table 66 (FIGS. 3 and 4) adjacent the associated jack screw 70, 72, 74, jack screw 70 being shown for purposes of illustration. The inner member 92 is generally cylindrical in shape and includes a threaded bore 104 which is sized to receive the associated jack screw 70.

The inner member 92 is sized to slidably engage the transverse bore 98 of the cage portion 94 with sufficient clearance to provide a loose fit. Preferably, the inner member 92 is sized to provide a clearance of approximately 1/32 inch between its outer periphery and the wall of the transverse bore 98. Similarly, the vertical bore 96 is sized to receive the associated jack screw 70 therethrough with sufficient clearance to provide a gap of approximately 1/32 inch between the screw 70 and the wall of the bore 96. The gaps formed between the inner member 92 and the transverse bore 98, and the jack screw 70 and vertical bore 96 provide a relatively loose connection between the jack screw 70 and table 66 (FIG. 7).

As shown in FIG. 7 for connector nut 84 and jack screw 74, the loose fit between the outer and inner members 90, 92 provides a limited range of movement which is sufficient to compensate for misalignment of the jack screws 68–74 relative to each other and eliminate binding of the table assembly 64. Specifically, the loose fit permits the connector nut 84 to move in a rectilinear fashion forwardly or rearwardly relative to the table 66 in the direction of double-ended arrow B parallel to the table, and to rotate slightly relative to the table in a vertical plant perpendicular to the table and extending transversely of it, indicated by the double-ended arrow C. Additionally, the shaft 100 is rotatably mounted to the table 66 which permits rotation of the jack screw 74 relative to the table in a plane perpendicular to it and parallel to a lateral edge 106, as shown by double-ended arrow D. The connector nut 84 also is displaceable toward and away from the table, as indicated by double-ended arrow E.

Connector nuts 84 and 86 are identical in construction except that nut 84 has a shaft 100 (FIG. 4) without means for retaining the nut within its bore in the table. However, as shown in FIGS. 3, 5, and 7, connector nut 86 includes a hole 108 in shank 100 which receives a pin 110. The pin 110 is preferably press-fitted into the table and hole 110 is sized to provide a slight gap between the wall of the hole and the pin 110. As shown in FIG. 7, the pin 110 limits the range of movement of the table 66 relative to the jack screw 70 since it reduces the rotational travel of the outer member 90 of the connector nut 86 in the direction of arrow D' and limits sideward movement of the connector nut in the direction of arrow E'. However, the loose fit between the inner member 92 and its cage 94 of the connector nut 86 still permits a limited travel of the cage portion relative to the jack screw 70 in the direction of arrows B and C.

The connector nut 88 which is mounted on the driving screw 68 is shown in FIGS. 3, 5, and 7, and includes a one-piece body 112 having a threaded hole 114 for receiving the driving screw and a shaft 116 which is journaled into a bore formed in the side of the table 66. The shaft 116 includes a hole 118 which receives a pin 120 in a manner similar to that for shaft 100 and pin 110 of connector nut 86.

As shown in FIG. 7, the driving connector nut 88 allows a more limited range of movement between the jack screw 68 and table 66, permitting limited sideward movement in the direction of arrow E' and limited rotational movement of the connector nut in the direction of arrow D'.

Thus, the connector nuts 84, 86, 88 provide a self-adjusting feature which compensates for the misalignment of the jack screws 68–74 within the housing 24 (FIG. 1) by providing a flexible connection between the jack screws and table 66 which permits slight movement of the table relative to the jack screws. Regardless of the orientation of the jack screws relative to each other, provided the misalignment is of a relatively small magnitude, the table can be raised and lowered by rotation of the jack screws 68–74 without binding. Connector nut 88 is relatively limited in its range of movement relative to the table and provides a datum against which the other connector nuts 84, 86 self-adjust.

Figure 8:
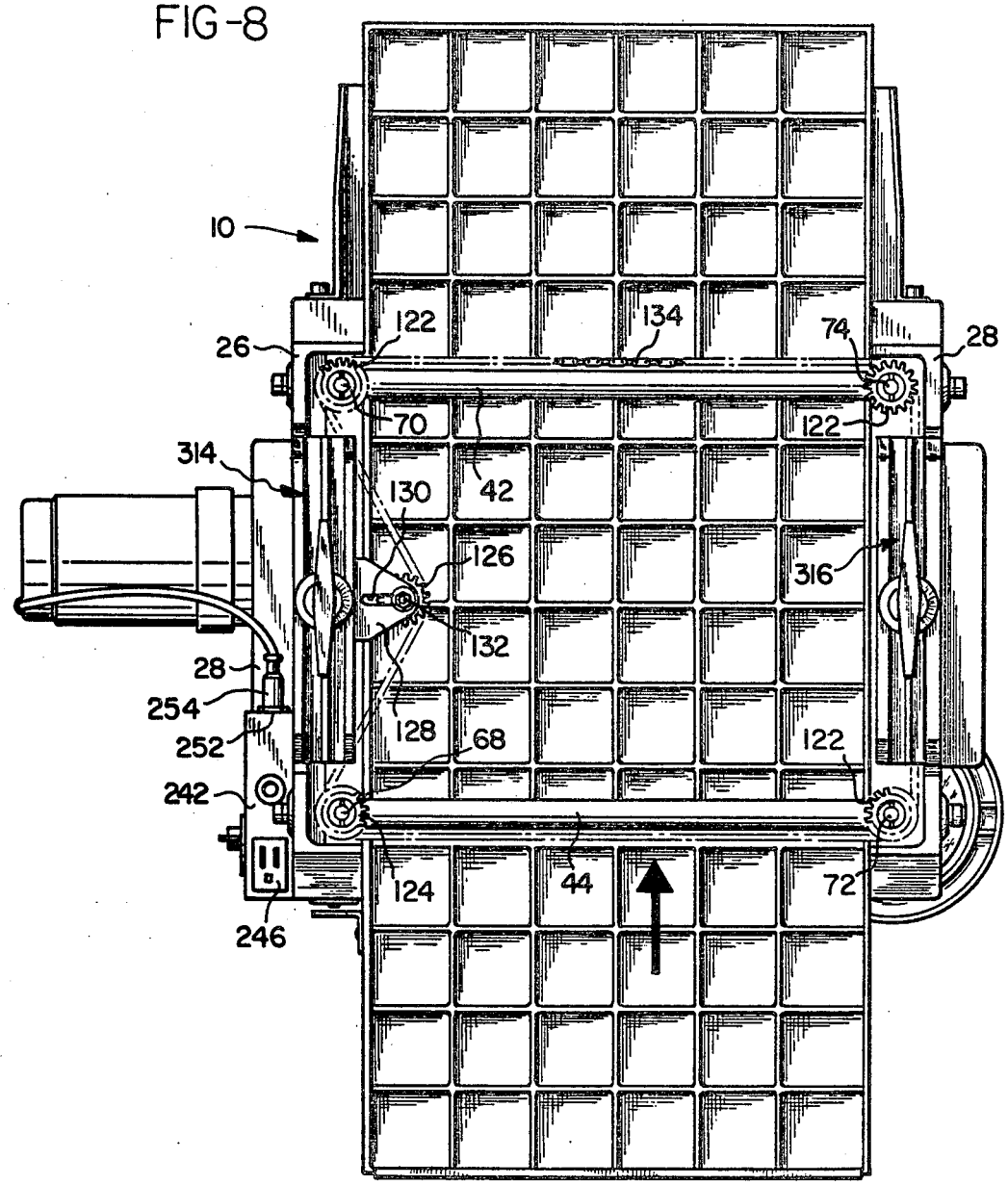
FIG. 8 is a bottom view of the planer of FIG. 1, showing the chain drive and clamping bars.

As shown in FIGS. 3, 4, and 8, each of the jack screws 70, 72, 74 includes a sprocket 122 mounted to its lower end, and driving screw 68 includes a drive sprocket 124 mounted to its lower end. An idler sprocket 126 is rotatably mounted to an angle 128 which is attached to side wall 28. Idler sprocket 126 is mounted within a substantially horizontal slot 130 in the angle 128 and is retained therein by an adjusting nut 132. A sprocket chain 134 is entrained about driven sprockets 122, drive sprocket 124, and idler sprocket 126 such that rotation of the driving jack screw 68 causes synchronous rotation of jack screws 70, 72, 74. Displacement of idler sprocket 126 within slot 130 causes the sprocket chain 134 to become tensioned or relaxed.

It should also noted that a selected one of the jack screws 68–74 may be rotated relative to the other jack screws to displace its associated connector nut to level the table 66. The adjusting nut 132 is loosened to permit the idler sprocket 126 to be displaced toward the side wall 28, thereby relaxing the tension it exerts upon the sprocket chain 134. The sprocket chain 134 may then be removed from engagement with the selected sprocket and the jack screw associated with the sprocket rotated. After the leveling function has been performed, the chain 134 can be threaded back onto the selected sprocket and the idler sprocket 126 displaced to exert the proper tensioning on the sprocket chain to permit synchronous rotation of the jack screws 68–74.

Figure 9A:
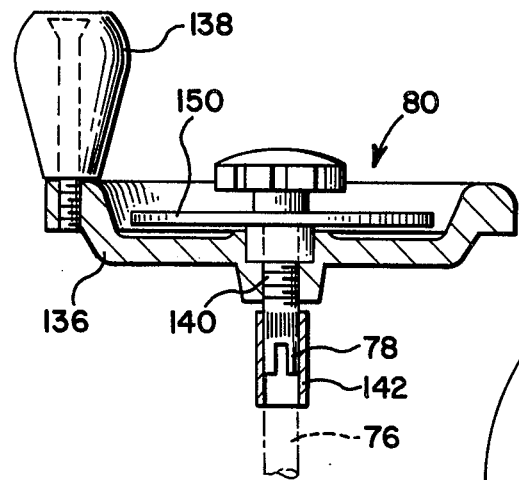
FIG. 9A and 9B show a side elevation in half-section and a plan view, respectively, of the hand wheel of the planer of FIG. 1.
Figure 9B:
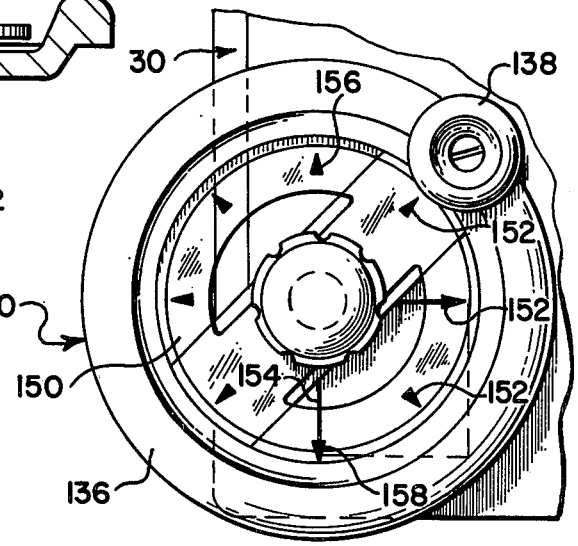

As shown in FIGS. 2 and 3, rotation of the driving jack screw 68 is effected by turning the hand wheel 80. The hand wheel 80, shown in FIGS. 9A and 9B, is of well-known design and includes a circular wheel portion 136 having a knob 138 threaded thereto. The slotted boss 78 forms a lower portion of a threaded shaft 140 which is press-fitted to the center of the wheel 136. A sleeve 142 is press-fitted over the boss 78 and aids in guiding the boss downwardly through the top cover 30 of the planer and over the extension 76 of the driving jack screw 68.

As shown in FIG. 2, the planer 10 includes a rough depth gauge 144 which consists of a vertical scale 146 mounted to side wall 28 and an indicator arrow 148 extending sidewardly from the table 66. Rotation of the hand wheel 80 rotates the driving jack screw 68 and displaces the table 66 in a manner previously described, thus moving the indicator arrow 148 relative to the scale 146. Such depth gauges are well-known in the art.

However, the planer 10 of the present invention includes a more precise depth gauge which is associated with the hand wheel 80. The hand wheel 80 shown in FIGS. 9A and 9B has a fine depth adjustment scale which consists of a disk 150, made of a transparent material such as plastic, having a series of indicia 152 spaced incrementally about its periphery. Beneath the disk 150 a reference indicium 154 is attached to the top cover 30 and is located directly beneath the indicia 152. Rotation of the hand wheel 80 also rotates the disk 150 which brings the indicia 152 into and out of vertical alignment with reference indicium 154.

Accordingly, a relatively large angular rotation of the hand wheel 80 results in a relatively small displacement of the table 66. For example, in a preferred embodiment of the planer 10, the threads of the jack screws 68–74 are pitched such that rotation of indicium 156 to position 158, a rotation of the hand wheel 80 through an angle of 180°, results in a displacement of the table of approximately 1/16 inch.

In operation, the hand wheel 80 is rotated to displace the table downwardly a predetermined distance beneath the cutting edges 52 of the blade member 46 which will provide a cut slightly less in depth than the desired depth. The blade member 46 is rotated by the head stock 20 (FIG. 1) and the stock is fed through the interior chamber 36 of the planer 10 to form a preliminary cut. The resultant thickness of the planed stock is measured and the difference between the thickness and the desired thickness is determined. The hand wheel 80 is then rotated an amount sufficient to displace the table 66 upwardly to increase the depth of the cut to remove the differential thickness from the stock. The stock is then passed through a second time and a planing of the proper depth is effected.

Chip Removal System

Figure 11:
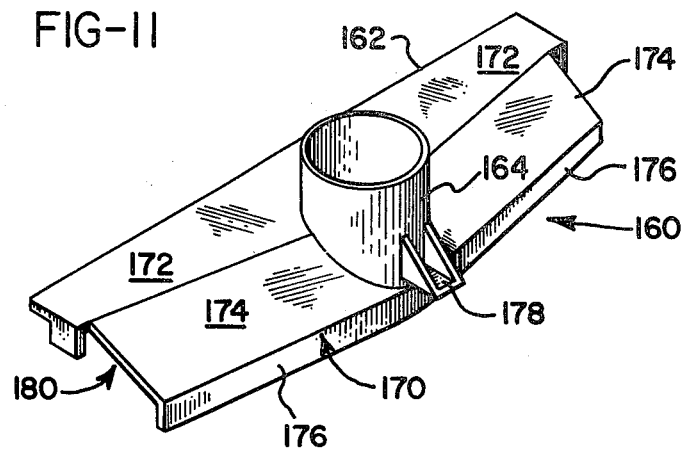
FIG. 11 is a perspective view of the chip removal hood of FIG. 10.

As shown in FIGS. 2, 10, and 11, the planer 10 includes a chip removal system having a chip removal hood 160 removable mounted within the interior chamber 36 of the housing 24. The hood 160 includes a leading transverse edge 162 adapted to abut or overlay (shown in FIG. 10) the trailing edge 60 of the chip shield 56. The hood 160 also includes an exhaust nozzle 164 which is generally cylindrical in shape and positioned to extend upwardly from the hood to protrude through an opening 166 in the top hood 32. The nozzle 164 is adapted to receive an end of a flexible hose 168 which communicates with a shop vacuum or other vacuuming device of well-known design (not shown).

The hood 160 includes a body 170 having a top panel 172, side panels 174 and a forward panel 176 which extends below the side panels 174 and the nozzle 164. A mounting bracket 178 extends forwardly from the nozzle 164 and is adapted to support the hood 160 upon the rod 40 which extends across the housing 24 within the interior chamber 36. The top panel 172, side panels 174, and forward panel 176 together form a concavity 180 which opens toward the downstream side of the blade member 46 and converges toward the nozzle 164.

As shown in FIG. 10, side wall 26 is abutted by an edge of a side panel 174 so that the portion of the side wall immediately upstream of the side panel forms a portion of the concavity adjacent the blade member 46. A portion of the side wall 28 (FIG. 4) also forms a portion of the concavity 180 in a similar fashion.

In operation, the head stock 20 (FIG. 1) is activated to rotate the blade member 46 and the vacuum (not shown) is actuated to create suction in the vicinity of the concavity 180. Wood stock 182 is fed into the planer 10 and the rotating blades 50 shave chips of wood 184 from the upper surface of the stock 182 and propel them along the passageway 62 between the chip shield 56 and blade member 46. The chips leave the passageway 62 and enter the concavity 180 where the vacuum sucks the chips through the nozzle 164 and into the vacuum hose 168. It should be noted that the forward panel 176 of the hood 160 should not extend below the level of the rod 40 so that it will not interfere with the passage of the stock 182 through the interior chamber 36 of the housing 24. Thus, wood chips 184 are removed from the vicinity of the planer housing 24 and do not contaminate the planed stock 182 or the planer 10.

Feed Mechanism

As shown in FIGS. 3 and 4, the planer 10 includes a first roller assembly 186, positioned upstream of the blade member 46, and a second roller assembly 188 positioned downstream of the blade member. First roller assembly 186 includes a roller 190 having a surface made of rubber or other frictional material and is rotatably mounted to the ends of a pair of opposing link arms 192, 194. Link arm 192 is rotatably mounted at an opposite end to the housing 24 by a bolt and washer combination 196 which is threaded into side wall 26. Similarly, link arm 194 is mounted rotatably to the housing 24 by a bolt and washer combination 198 which is threaded into side wall 28.

Side walls 26 and 28 include threaded sleeves 200, 202, respectively, which receive set screws 204, 206. Link arms 192, 194 each include bosses 208, 210 which support compression springs 212, 214 that urge against the underside of the set screws 204, 206. Springs 212, 214 urge downwardly against the link arms 192, 194, rotating them about bolt 196, 198, respectively.

The side walls 26, 28 each include inwardly extending ribs 216, 218 which provide lower stops for the rotation of the link arms. Thus, the roller 190 is limited in its range of rotation of travel about the bolts 198 to an upper position defined by the point at which the springs 212, 214 are fully compressed, and a lower position defined by the ribs 216, 218, which contact the link arms 192, 194 adjacent the roller 190. The resultant range of travel is a substantially vertical path.

The structure of the second roller assembly 188 is identical to that of the first roller assembly 186, but is of reverse hand. Therefore, like reference numerals will be utilized referring to like components with the addition of a prime (') after the reference numeral to denote its reference to the second roller assembly 188. Thus, second roller assembly 188 includes a pair of opposing link arms 194' rotatably mounted to the side walls 26, 28 by bolt and washer combinations 196', 198' and supporting a roller 190' at opposite ends adjacent the cutter member 46.

The link arms 192', 194' are biased downwardly by springs 212', 214' retained within sleeves 200', 202' by set screws 204', 206' and are seated on bosses 208', 210'. The ribs 216, 218 provide stops for the downward rotation of link arms 192', 194' and the springs 212', 214' provide upper stops for the upward rotation of the link arms 192', 194' in a manner similar to that described for the first roller assembly 186. It should be noted that the trailing end 58 of the chip shield 56 should be positioned above the lowermost portion of the rollers 190, 190', when the rollers are at their uppermost positions in which the springs 212, 212', 214, 214' are fully compressed, to prevent the stock 220 (shown in phantom in FIGS. 3 and 4) from inadvertently contacting the chip shield during the planing operation.

Figure 12:
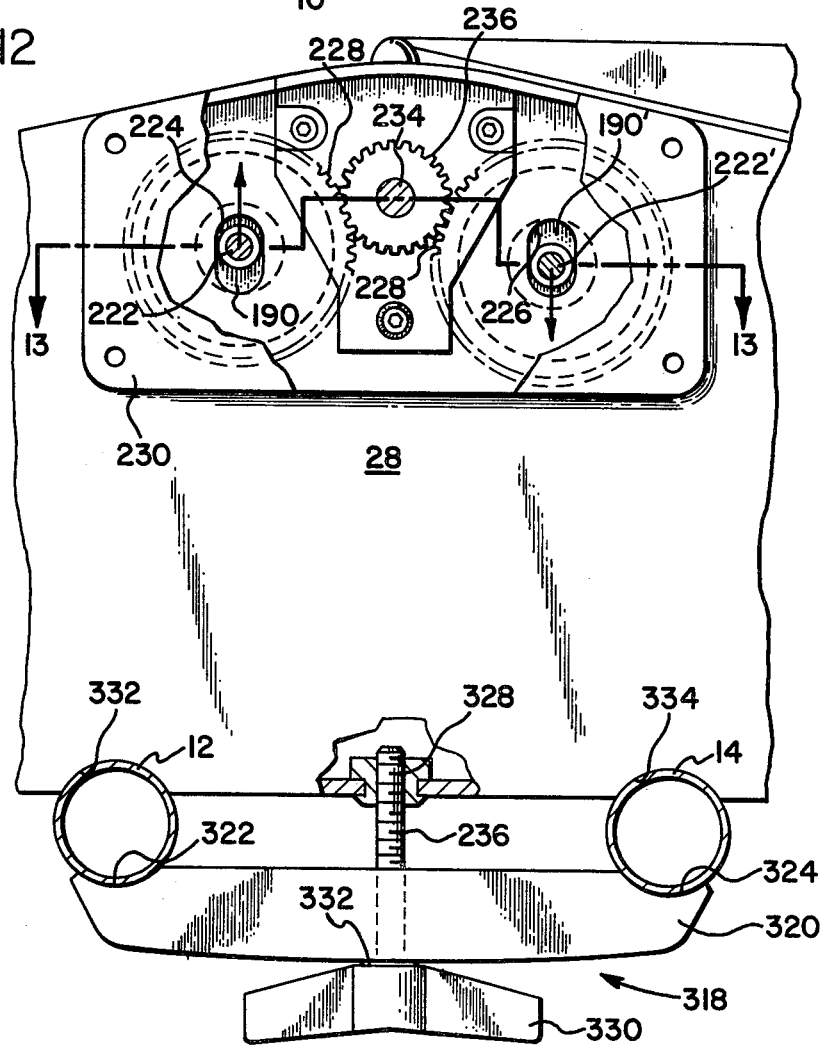
FIG. 12 is a detail of a side elevation of the planer of FIG. 1 showing the roller sprockets and a mounting member.

As shown in FIGS. 2, 12, and 13, the rollers 190, 190' of the first and second roller assemblies 186, 188 include extensions 222, 222' which protrude through slots 224, 226 in the side wall 28. Extensions 222, 222' support roller sprockets 228, 228'. Roller sprockets 228, 228' are enclosed within a gear box 230 which is bolted to the side wall 28 and supports a direct current feed motor 232. The motor 232 includes an output shaft 234 which mounts a drive sprocket 236 that meshes with roller sprockets 228, 228'. Rotation of the drive sprocket 236 by the motor 232 imparts rotational movement to the roller sprockets 228, 228', thereby rotating rollers 190, 190' of the first and second roller assemblies 186, 188 in the same direction.

The meshing engagement of the drive sprocket 236 with the roller sprockets 228, 228' is sufficiently deep, and the position of the drive sprocket is such that there is a meshing engagement between the drive and roller sprockets regardless of the position of the rollers 190, 190' and sprockets 228, 228' relative to the drive sprocket 236 during a planing operation. That is, the interengagement of the sprocket teeth of the drive sprocket 236 and roller sprockets 228, 228' is sufficient that there will be a driving engagement between them when the sprockets are displaced to their uppermost position, and when displaced to their lowermost position.

Similarly, the meshing engagement will exist when an upstream sprocket 228 is in a lower position than a downstream sprocket 228', and vice versa. Thus, the roller assemblies 186, 188 are provided with a positive driving engagement by a stationary driving source throughout a limited range of substantially vertical displacement relative to the housing and to the blade member 46.

Figure 14:
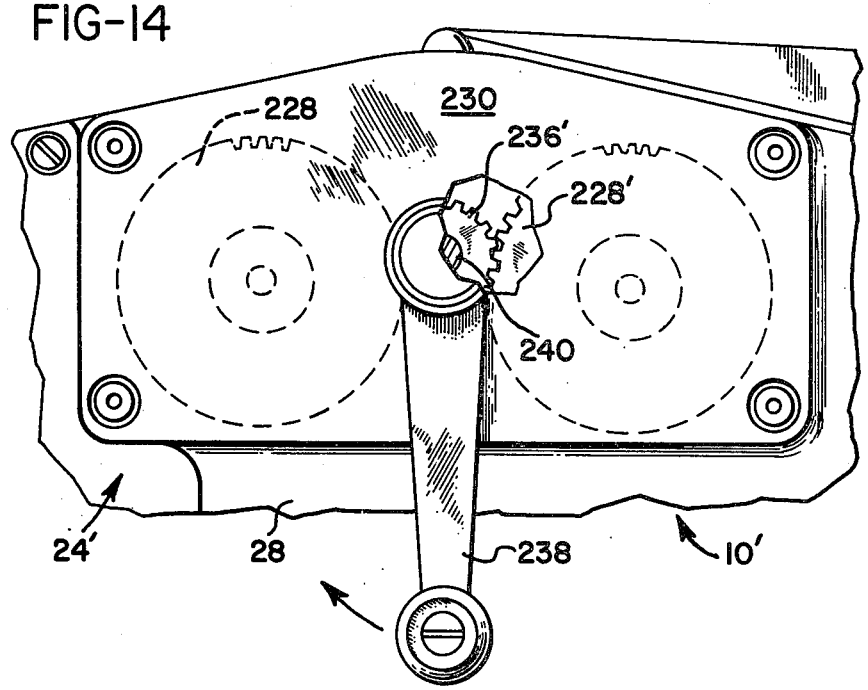
FIG. 14 is a detail of an alternate embodiment of the planer in which a hand crank is utilized to drive the rollers.

An alternate embodiment of the invention, planer 10', is shown in FIG. 14 in which the motor 232 (FIG. 2) has been removed and a hand crank 238 has been substituted for it. The hand crank 238 is rotatably mounted to the gear box 230 and includes an output shaft 240 which mounts the drive sprocket 236'. The drive sprocket 236' functions in a manner identical to drive sprockets 236 utilized with motor 232. The advantages of the planer 10' are similar as well: a stationary driving means rotates a stationary drive sprocket 236' which drivingly engages roller sprocket 228, 228' which are vertically displaceable and are driven regardless of their position within a range of vertical movement relative to the drive sprocket and housing 24'.

To operate the feed mechanism, the table 66 of the planer is first adjusted to the desired depth beneath the blade member 46. The head stock 20 is actuated to rotate the blade member 46 and the feed motor 232 (or hand crank 238) is actuated to rotate the rollers 190, 190'. The stock 220 is manually fed into the interior chamber 36 of the housing 24 along the table 66 until it encounters the upstream roller 190 of the first roller assembly 186. The frictional covering of the roller 190 grips the leading end of the stock 220 and urges the stock forwardly to engage the rotating blade member 46.

The blades 50 of the blade member 46 plane the stock 220 and the stock is propelled downstream to engage the roller 190' of the second roller assembly 188. The roller 190' also urges the stock 220, now having a shorter height than before the planing operation, away from the blade member 46.

Thus, the roller assemblies 186, 188 exert a downward force upon the stock 220, holding it against the table 66 both before and after the planing operation; the reduction in height caused by the planing operation being compensated for by the downward rotational movement of the roller 190' of the second roller assembly 188. The roller assemblies 186, 188 also compensate for the cutting force of the blade member 46, which is counter to the direction of stock feed and tends to urge the stock 220 in the reverse direction.

SWITCH BOX

Figure 15:
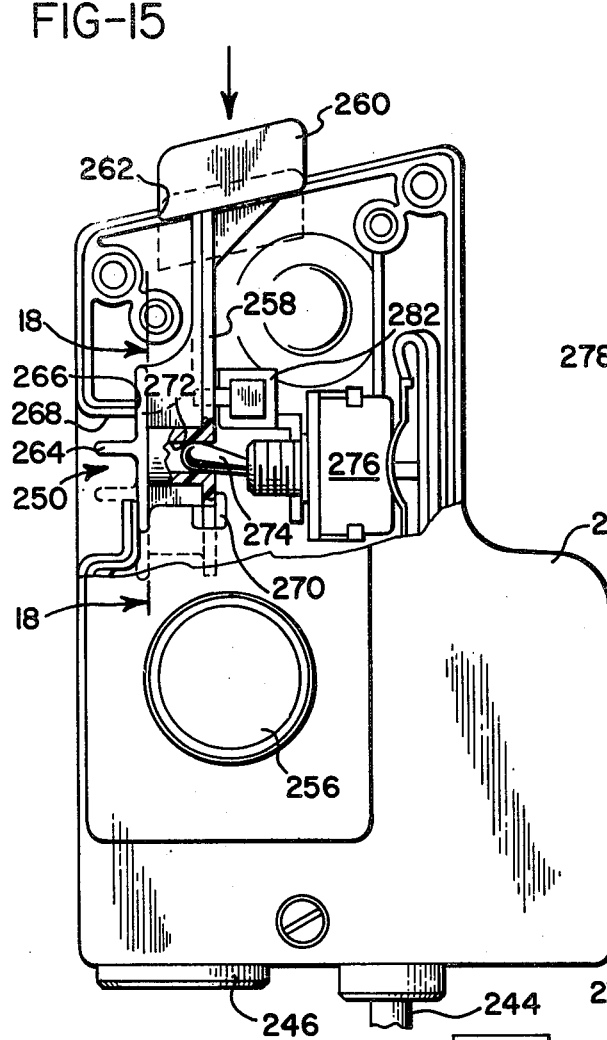
FIG. 15 is a side elevation of the control box shown in FIG. 2, partially broken away to show the master switch.

As shown in FIGS. 2, 8, and 15, the planer 10 includes a switch box 242 which is mounted to side wall 28. The switch box 242 includes a main power cord 244, a receptacle 246 which receives the power cord 248 from the head stock 20 of the multipurpose tool 16 (FIG. 1), and a master switch 250. The switch box 242 also includes a direct current receptacle 252 which receives the power cord 254 of the direct current feed motor 232. A dial 256 connected to a speed control is mounted on a side of the switch box 242.

As shown in FIGS. 15-18, the master switch 250 includes a switch member 258 having an upper portion mounting a button 260 which protrudes through an opening 262 in the top of the housing 242. The switch member 258 also includes a lever 264 which protrudes through an opening 266 formed in a recess 268 in a front portion of the switch box 242.

The switch member 258 is slidably mounted within the box 242 for vertical movement against guides 270. The switch member 258 includes a recess 272 (see also FIG. 18) which receives the toggle 274 of a double pole, single throw toggle switch 276 mounted within the box 242. Thus, upward displacement of the switch member 258 flips the toggle 274 of the toggle switch 276 to a closed or "on" position, and downward displacement of the switch member flips the toggle to an open or "off" position (shown in phantom for switch member 258 in FIG. 15).

The master switch 250 also includes a locking mechanism 278 having a locking pin 280 which slidably engages a bushing formed in the switch box 242 and includes a detent 284 protruding outwardly from a side in a direction toward the master switch 258. The locking pin 280 is generally square in cross section, as is the bushing 282 (FIG. 15) such that rotational movement of the locking pin about a longitudinal axis is prevented. The locking pin 280 is biased inwardly toward the center of the switch box 242 by a spring 286.

Figure 17:
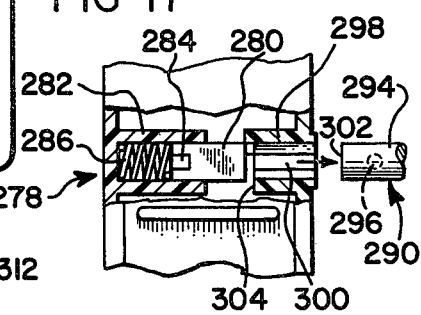
FIG. 17 is a detail of the front elevation of FIG. 16, showing the locking mechanism in a locked position.

The switch member 258 includes a notch 288 (FIG. 18) which is positioned to receive the detent 284 when the switch member is in an open or off position and the pin 280 is displaced sidewardly as shown in FIG. 17. Thus, when the pin 280 is displaced to compress the spring 286 against the switch box 242, the detent 284 is in an unlocked position and the switch member 258 is free to be displaced upwardly or downwardly to on or off positions, respectively.

When the pin 280 is displaced toward the center of the box 242, as shown in FIG. 17, the detent 284 is in a locked position such that it engages the notch 288 of the switch member 258 when the switch member is in the open or off position, thereby preventing the switch member from being displaced upwardly to an on position. The spring 286 therefore acts to displace the pin 280 and detent 284 to the locking position automatically when the switch member 258 is displaced downwardly its open position.

To unlock the locking mechanism 278, a key 290 is provided which includes a flange 292 joined to a cylindrical shaft 294 having a boss 296 protruding from its side. The key 290 is mounted within a cylindrical bore 298 having a key slot 300.

Figure 16:
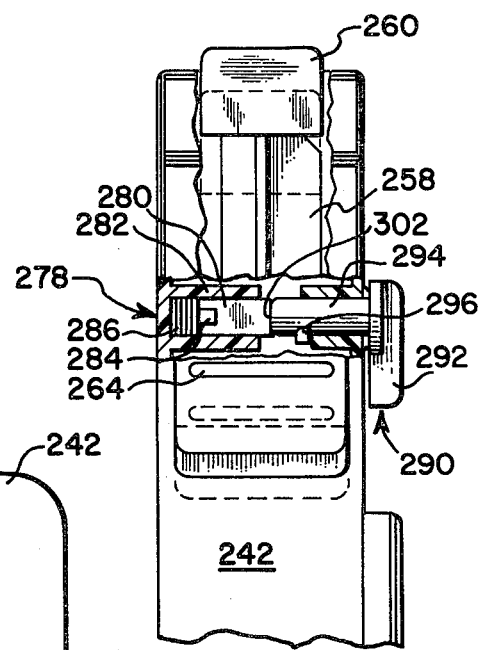
FIG. 16 is a detail of a front elevation of the control box of FIG. 15, broken away to show the locking mechanism, in an unlocked position.

To displace the pin 280 to the unlock position, the shaft 294 of the key 290 is inserted into the bore 298 such that the shaft end 302 abuts the pin 280. The key 290 is displaced within the bore 298 until the pin 280 is displaced to the unlocked position. At this location, the boss 296 has cleared the key slot 300, and the key is rotated to bring the boss 296 into engagement with the interior end 304 of the bore 298 (FIG. 16).

To release the pin 280 to the locked position, the key 290 is rotated, bringing the boss 296 into registry with the key slot 300, allowing the spring 286 to displace the pin 280 and detent 284 to the locked position, and at the same time displace the key outwardly along the bore 298. As shown in FIG. 17, the key 290 is removable from the bore 298 so that the key may be retained by the operator to prevent the master switch 258 from being displaced to the on position.

Figure 19:
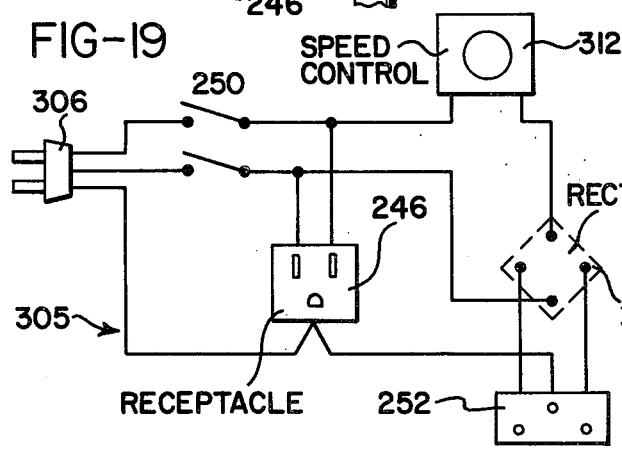
FIG. 19 is an electrical schematic of the circuitry of the switch box of FIG. 15.
Figure 18:
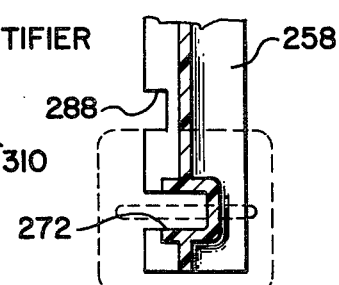
FIG. 18 is a detail of the switch member, taken at line 18—18 of FIG. 16.

The circuitry 305 of the switch box 242 is shown in FIG. 19. A main power plug 306 (part of main power cord 244) is adapted to be plugged into a receptacle supplying household alternating current. The master switch 250 is connected in parallel with the plug 306 and can be actuated to an open or closed position to provide alternating current to the entire circuit 305. The receptacle 246 which receives the power cord 248 from the head stock 20 (FIGS. 1 and 2) is connected in parallel with the master switch. The receptacle 252, which supplies the direct current motor 232 (FIG. 2) is connected to the master switch 250 and is supplied with direct current by means of a rectifier 310. The rectifier 310 is a full wave bridge rectifier of a type well-known in the relevant art.

A speed control 312 is connected to the master switch 250 to regulate the voltage across the receptacle 242 and vary the rotational speed of the feed motor 232. The speed control 312 is also of a type well-known in the art such as, for example, a variable speed control manufactured by Tecor, Part No. MSC41BSPEC. The speed control 312 is actuated by dial 256 shown in FIG. 15.

Thus, the circuit 305 provides for a single master switch 250 to control the power supplied to both the drive motor 232 and the motor of the head stock 20 of the multipurpose tool 16 (FIG. 1). There is no need for the operator to switch on the head stock 20, then switch on the feed motor 232, then repeat the process to shut down the system. Thus, such a circuit saves operating time and is more convenient for the operator. Additionally, the locking mechanism 278 (FIGS. 16 and 17) is employed to lock both the head stock 20 and feed motor 232 in the off position, thus eliminating the possibility of unintentionally starting either the head stock or the feed motor. The top button 260 also provides an operator with a simple and accessible means of shutting off the entire system by hitting the top of the box 242.

Mounting System

The mounting system of the planer 10, generally designated 314, is shown in FIG. 1 and includes clamping members 316, 318 which are integral with side walls 26, 28 of the planer housing 24. Mounting members 316, 318 are identical in construction and therefore the mounting system 314 will be described with reference mounting member 318 shown in FIGS. 2 and 12, it being understood that the description applies equally to mounting member 316.

Mounting member 318 includes a retaining bar 320 which is generally elongate in shape and includes opposing ends having upwardly opening notches 322, 324. The notches 322, 324 are shaped to engage the cylindrical ways 12, 14 of the multipurpose woodworking tool 16 to which the planer 10 is mounted. A bolt 326 extends upwardly through the retaining bar 320 and is threaded into a bore 328 formed in the underside of the side wall 28. A wing cap nut 330 is mounted to a lower end of the bolt 326 and provides a surface 332 which supports the retaining bar 320.

Rotation of the wing cap nut 330 causes the bolt 326 to thread into the bore 328, thus displacing the wing cap nut upwardly and urging the retaining bar 320 upwardly so that the notches 322, 324 engaged the undersides of the ways 12, 14. The side wall 28 includes cutouts 332, 334 sized and positioned to receive the upper portions of the ways 12, 14. Displacement of the bolt 326 results in the ways 12, 14 being clamped between the retaining bar 320 and the cutouts 332, 334 of the side wall 28. Reverse rotation of the bolt 326 backs the wing cap nut 330 away from the side wall 28, and the retaining bar 320 drops downwardly away from the ways 12, 14 releasing the ways from the clamping engagement with the planer 10. The mounting system 314 permits the planer 10 to be removably mounted to the ways 12, 14 of a tool 16 without need of modifying the tool by permanently attaching brackets and the like.

Figure 20:
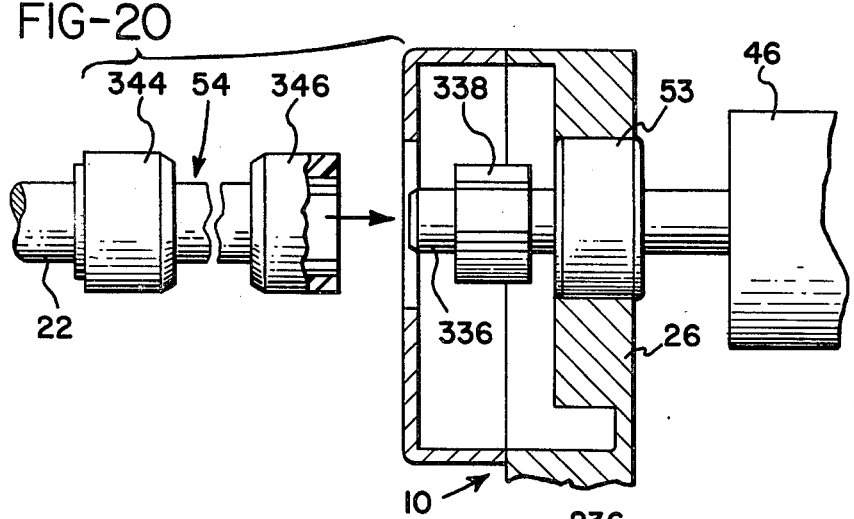
FIG. 20 is a detail of the coupling member of the planer of FIG. 1, shown partially broken away and removed from the spline of the cutter member.

As shown in FIGS. 1 and 20, the side walls 26, 28 have a height such that the blade member 46 is coaxial with the axis of rotation of the output shaft 22 of the head stock 20. The blade member 46 includes an extension 336 which mounts a spline member 338. The output shaft 22 is also fitted with a spline member (not shown) and the output shaft is operatively connected to the spline member 338 by a coupling member 54. Coupling member 54 is of a type well-known in the art, such as a coupler manufactured by Shopsmith, Inc., Dayton, Ohio. The coupling member 340 comprises a hollow plastic shaft 342 having a generally cylindrical shape and fitted with spline sockets 344, 346 at its ends.

The coupling member 340 is attached such that the spline socket 344 engages the spline of the output shaft 22 and spline socket 346 receives the spline 338 of the blade member 46. Rotational movement of the output shaft 22 is thus transmitted directly along the axis of rotation of the output shaft to the axis of rotation of the blade member 46; costly offset power transmitting couples are therefore not required. Accordingly, the mounting system 314 of the planer 10 permits the planer to be slidably mounted on the ways 12, 14 of the woodworking tool 16 and the housing 24 is sized such that, when so mounted to a woodworking tool, the axis of rotation defined by the center of the blade member 46 is collinear with the next axis of rotation of the output shaft 22 of the head stock 20, allowing the use of a simple and inexpensive coupling member 340 to transmit power to the blade member of the planer.

While the forms of apparatus herein described constitute preferred embodiments of this invention, it is to be understood that the invention is not limited to these precise forms of apparatus, and that changes may be made therein without departing from the scope of the invention.

What is claimed is:

1. In combination with a wood working machine of the type having a head stock including an output shaft having a substantially horizontal axis of rotation, a pair of ways oriented parallel to each other and to said axis of rotation and supporting said head stock for slidable movement therealong, a frame supporting said ways at ends thereof, and a planer having a housing including a pair of opposing side walls, a blade member rotatably mounted to and extending between said side walls and having a coupling portion extending through one of said side walls and terminating exteriorly of said housing, a planer mounting system comprising:

means attached to said planer housing for releasably mounting said planer to said ways;

the vertical distance between said attaching means and said coupling portion being substantially equal to the vertical distance between said ways and said head stock output shaft, such that said blade member and said coupling portion are coaxial with said axis of rotation of said output shaft; and a coupling member coaxial with said output shaft and said coupling portion and extending there-between such that said coupling member transmits rotary power from said output shaft to said coupling portion along said axis.

2. The mounting system of claim 1 wherein said mounting means includes a pair of clamping members, each attached to a different one of said side walls and including a bolt attached to and extending downwardly from an associated one of said side walls; a retaining bar slidably attached to said bolt, including opposing ends having upwardly opening notches sized and positioned to receive said ways; and means for displacing said retaining bar along said bolt such that said ways may be clamped against said side walls by said retaining bars.

3. The mounting system of claim 2 wherein said retaining bar displacing means include wing cap nuts supporting said retaining bars and mounted to lower ends of said bolts and said side walls including bores receiving said bolts such that rotation of said wing cap nuts displaces said bolts upwardly into said bores, thereby drawing said retaining bars toward side walls.

4. The mounting system of claim 3 wherein said side walls each include a bottom surface having a pair of cutouts sized and positioned to receive said ways; said cutouts being positioned to oppose said notches in an associated one of said retaining bars.

* * * * *

UNITED STATES PATENT AND TRADEMARK OFFICE
CERTIFICATE OF CORRECTION

PATENT NO. : 4,440,204  
DATED : April 3, 1984  
INVENTOR(S) : Robert L. Bartlett It is certified that error appears in the above-identified patent and that said Letters Patent is hereby corrected as shown below:

In the Abstract, line 1, "planar" should be --planer--.

Column 1, line 56, "is is" should be --is--.

Column 4, line 29, "Since relatively" should be
    --Since a relatively--.

Column 6, line 27, "of" should be --or--.

Column 6, line 33, "disengaged" should be --disengages--.

Column 8, line 45, "52 at a" should be --52 a--.

Column 9, line 54, "plant" should be --plane--.

Column 10, line 21, "limited;" should be --limited--.

Column 11, line 60, "removable" should be --removably--.

UNITED STATES PATENT AND TRADEMARK OFFICE
CERTIFICATE OF CORRECTION

PATENT NO. : 4,440,204

DATED : April 3, 1984

INVENTOR(S) : Robert L. Bartlett

It is certified that error appears in the above-identified patent and that said Letters Patent is hereby corrected as shown below:

Column 13, line 66, "sprockets" should be --sprocket--.

Column 15, line 23, "downwardly its" should be --downwardly to its--.

Column 17, line 14, "with the next axis" should be --with the axis--.

Column 18, line 30, claim 3, "toward side walls" should be --toward said side walls--.

Signed and Sealed this

Fourth Day of September 1984

[SEAL]

Attest:

GERALD J. MOSSINGHOFF

Attesting Officer

Commissioner of Patents and Trademarks